United States Patent
Huber et al.

(10) Patent No.: US 9,593,973 B2
(45) Date of Patent: Mar. 14, 2017

(54) MEASURING TRANSDUCER OF VIBRATION-TYPE AS WELL AS MEASURING SYSTEM FORMED THERWITH

(71) Applicant: Endress + Flowtec AG, Reinach (CH)

(72) Inventors: Christof Huber, Bern (CH); Alfred Rieder, Landshut (DE); Christian Schutze, Basel (CH); Ennio Bitto, Aesch (CH); Martin Josef Anklin, Dornach (CH)

(73) Assignee: Endress + Hauser Flowtec AG, Reinach (CH)

(*) Notice: Subject to any disclaimer, the term of this patent is extended or adjusted under 35 U.S.C. 154(b) by 0 days.

(21) Appl. No.: 14/758,323

(22) PCT Filed: Nov. 26, 2013

(86) PCT No.: PCT/EP2013/074688
§ 371 (c)(1),
(2) Date: Oct. 28, 2015

(87) PCT Pub. No.: WO2014/102037
PCT Pub. Date: Jul. 3, 2014

(65) Prior Publication Data
US 2016/0041018 A1 Feb. 11, 2016

(30) Foreign Application Priority Data

Dec. 30, 2012 (DE) .................. 10 2012 025 246
Mar. 18, 2013 (DE) .................. 10 2013 102 711

(51) Int. Cl.
*G01F 1/84* (2006.01)
(52) U.S. Cl.
CPC .......... *G01F 1/8413* (2013.01); *G01F 1/8418* (2013.01); *G01F 1/8472* (2013.01)

(58) Field of Classification Search
USPC ............. 73/861.355–861.357; 702/54, 183
See application file for complete search history.

(56) References Cited

U.S. PATENT DOCUMENTS

| 5,129,263 A * | 7/1992 | Chi .................... G01F 1/8413 73/861.355 |
| 5,398,554 A | 3/1995 | Ogawa et al. |

(Continued)

FOREIGN PATENT DOCUMENTS

| DE | 3916285 A1 | 11/1990 |
| DE | 4027936 A1 | 5/1992 |

(Continued)

OTHER PUBLICATIONS

Inglish Translation of International Preliminary Report on Patentability, WIPO, Geneva, Jun. 30, 2015.

(Continued)

*Primary Examiner* — Jewel V Thompson
(74) *Attorney, Agent, or Firm* — Bacon & Thomas, PLLC

(57) ABSTRACT

The measuring transducer comprises a measuring tube having an inlet-side tube end and an outlet-side tube end, a tube wall having a predetermined wall thickness and a lumen surrounded by the tube wall and extending between the first and second tube end, a support element, which with a support end is mechanically connected with the tube end and with a support end is mechanically connected with the tube end, as well as, laterally spaced from the measuring tube, a support element, which with a support end is mechanically connected with the support end and with a support end is mechanically connected with the support end. The measuring tube of the measuring transducer is adapted to guide a flowing medium in its lumen and during that to be caused to oscillate about a static resting position for producing Coriolis forces. The measuring transducer comprises an oscillation exciter as well as at least one oscillation sensor. The (Continued)

measuring transducer has a wanted mode having a resonant frequency, in which the measuring tube can execute wanted oscillations around its static resting position suitable for producing Coriolis forces and having a wanted frequency corresponding to the resonant frequency of the wanted mode. The oscillation exciter is, furthermore, adapted to excite the wanted oscillations of the measuring tube, and the oscillation sensor, of which one sensor component is placed externally on the measuring tube and one sensor component is placed on the support element, is adapted to register movements of the measuring tube relative to the support element and to convert such into an oscillatory signal representing oscillations of the measuring tube.

56 Claims, 5 Drawing Sheets

(56) References Cited

U.S. PATENT DOCUMENTS

| | | | |
|---|---|---|---|
| 5,549,009 A * | 8/1996 | Zaschel | G01F 1/8409 73/861.355 |
| 5,691,485 A | 11/1997 | Endo et al. | |
| 8,104,360 B2 | 1/2012 | Bitto et al. | |
| 2003/0131669 A1 * | 7/2003 | Osawa | G01F 1/8413 73/861.355 |
| 2012/0123705 A1 * | 5/2012 | Drahm | G01F 1/8413 702/54 |
| 2015/0226590 A1 * | 8/2015 | Huber | G01F 1/8413 73/861.357 |
| 2016/0033314 A1 * | 2/2016 | Huber | G01F 1/8418 73/861.355 |

FOREIGN PATENT DOCUMENTS

| | | |
|---|---|---|
| DE | 69920241 T2 | 1/2005 |
| DE | 102004030392 A1 | 1/2006 |
| DE | 102006035877 A1 | 2/2010 |
| DE | 102010044179 A1 | 5/2012 |
| EP | 0598287 A1 | 5/1994 |
| EP | 0803713 A1 | 10/1997 |
| EP | 1260798 A1 | 11/2002 |
| JP | H0341319 A | 2/1991 |
| WO | 0012970 | 3/2000 |
| WO | 02099363 A1 | 12/2002 |

OTHER PUBLICATIONS

Enternational Search Report,, EPO, The Netherlands, Aug. 5, 2014.
German Search Report, German PTO, Sep. 17, 2013.

* cited by examiner

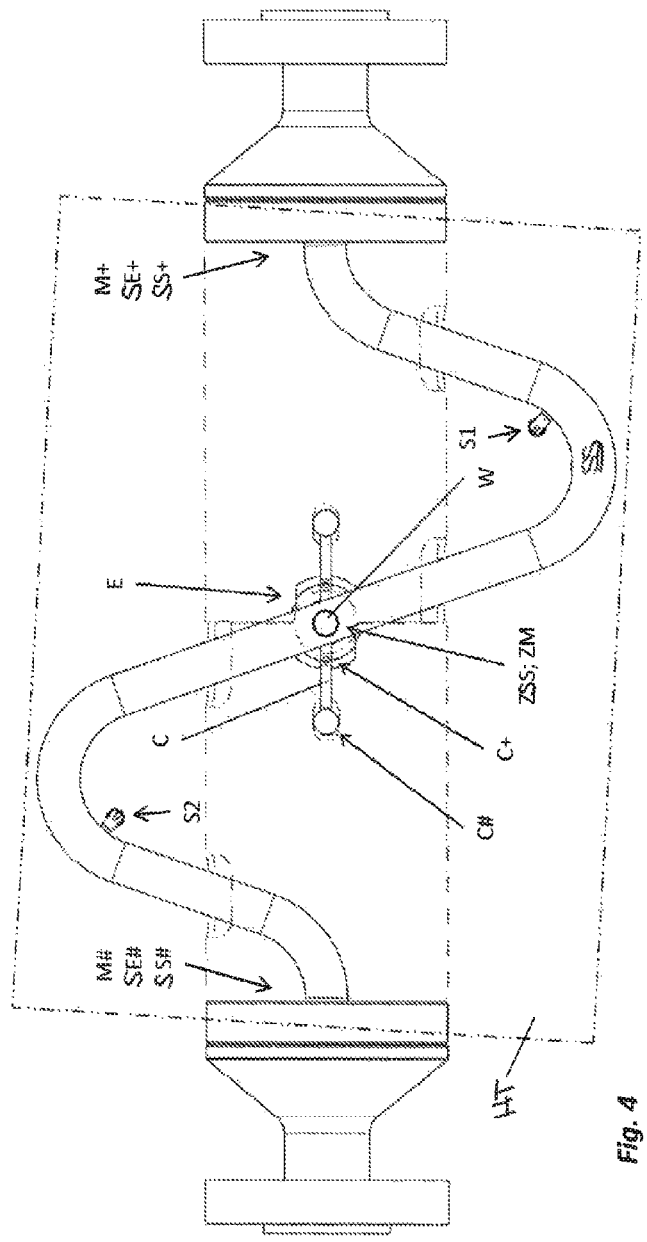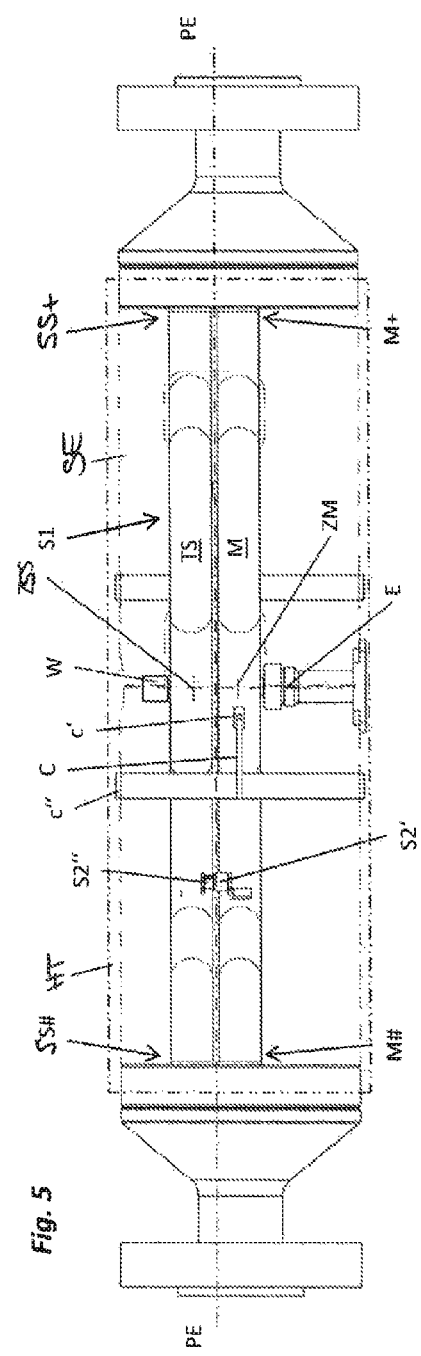
Fig. 4
Fig. 5

MEASURING TRANSDUCER OF VIBRATION-TYPE AS WELL AS MEASURING SYSTEM FORMED THERWITH

TECHNICAL FIELD

The invention relates to a measuring transducer of the vibration-type, especially one suitable for a Coriolis mass flow measuring device, as well as to a measuring system formed therewith, especially a Coriolis mass flow measuring device.

BACKGROUND DISCUSSION

Used in industrial measurements technology, especially also in connection with the control and monitoring of automated manufacturing processes, for ascertaining mass flow rates and/or mass flows of media, for example, liquids and/or gases, flowing in a process line, for example, a pipeline, are often measuring systems, which, by means of a measuring transducer of the vibration-type and a measuring—and operating electronics connected thereto and accommodated most often in a separate electronics housing, induce Coriolis forces in the flowing medium and, derived from these forces, generate measured values representing the mass flow, respectively the mass flow rate.

Such measuring systems—most often embodied as in-line measuring devices inserted directly into the course of the process line and, consequently, having a nominal diameter corresponding to a nominal diameter of the pipeline have been known for a long time and have proved themselves in industrial use. Examples of measuring transducers of vibration-type, respectively measuring systems formed therewith, are described e.g. in US A 2003/0084559, US A 2003/0131669, US A 2005/0139015, U.S. Pat. Nos. 4,655,089, 4,801,897, 4,831,885, 5,024,104, 5,129,263, 5,287,754, 5,381,697, 5,531,126, 5,705,754, 5,736,653, 5,804,742, 6,006,609, 6,047,457, 6,082,202, 6,223,605, 6,311,136, 6,360,614, 6,516,674, 6,840,109, 6,851,323, 7,077,014 or Published International Application, WO A 00/02020. Shown therein, in each case, is a measuring transducer having at least one measuring tube, which is point symmetric relative to a symmetry center. The measuring tube has a tube wall of a predetermined wall thickness and composed, for example, of a titanium-, zirconium- and/or tantalum alloy or a stainless steel, and a lumen extending between inlet-side and outlet-side, tube ends of the measuring tube and surrounded by the tube wall. The, for example, S-, respectively Z-shaped, or straight, measuring tube is held oscillatably in an outer support element, for example, of stainless steel, formed, for example, also as a measuring transducer housing jacketing the measuring tube and, consequently, protecting the measuring tube and/or as a support tube at least jacketing the measuring tube. The measuring tube is solidly connected only with its inlet-side tube end with a corresponding inlet-side support end of the outer support element and with its outlet-side tube end with a corresponding outlet-side support end of the outer support element, but is otherwise laterally spaced from the outer support element. The outer support element is, furthermore, adapted, directly, namely via, in each case, a connecting flange provided on each of its two support ends, to be mechanically connected with, in each case, a corresponding line segment of the pipeline, and, thus, to hold the total measuring transducer in the pipeline, respectively to absorb forces introduced from the pipeline. The measuring tube, in turn, opens with each of its two tube ends into the respectively corresponding connecting flanges for the purpose of forming a flow path connecting the two line segments for flow, namely permitting traversing flow from one line segment through the measuring tube to the other line segment.

The at least one measuring tube is, furthermore, adapted, in operation of the measuring system, to guide a flowing medium, for example, a gas and/or a liquid, in its lumen, so as to form with the respective lumen of the connected pipeline the mentioned flow path, and during that to be caused to oscillate about its static resting position for producing as measurable effect Coriolis forces usable for measuring the mass flow rate, and, consequently, the mass flow. Serving as wanted oscillations, namely oscillations of the measuring tube suitable for producing Coriolis forces, are usually oscillations of a natural mode of oscillation inherent to the measuring transducer, the so-called drive, or also wanted, mode, which are excited with an instantaneous resonant frequency of such mode of oscillation, for example, also with practically constant oscillation amplitude. The wanted oscillations generate, as a result of the medium flowing through the measuring tube oscillating in the wanted mode, Coriolis forces, which, in turn, bring about Coriolis oscillations, namely additional oscillatory movements of the measuring tube in the so-called Coriolis mode synchronous with the oscillatory movements of the measuring tube in the wanted mode and, consequently, superimposed thereon. Due to such superimposing of wanted- and Coriolis modes, the oscillations of the vibrating measuring tube registered by means of the sensor arrangements at the inlet side and at the outlet-side have a measurable phase difference dependent also on the mass flow rate.

As already indicated, selected as excitation—or wanted frequency, namely as frequency for the excited wanted oscillations, is usually an instantaneous natural resonant frequency of the oscillation form serving as wanted mode. The wanted mode is, in such case, also so selected that the resonant frequency is, especially, also dependent on the instantaneous density of the medium. As a result of this, the wanted frequency is variable within a wanted frequency interval corresponding to a fluctuation of a density of the medium flowing in the lumen of the measuring tube, whereby by means of market-usual Coriolis mass flow meters besides the mass flow supplementally also the densities of flowing media can be measured. Furthermore, it is also possible, such as, among other things, shown in the above mentioned U.S. Pat. Nos. 6,006,609 or 5,531,126, by means of measuring transducers of the type being discussed directly to measure a viscosity of the flowing medium, for example, based on an excitation power required for exciting, respectively maintaining, the wanted oscillations damped by the medium.

As, among other things, also shown in US A 2005/0139015, US A 2003/0131669, U.S. Pat. Nos. 7,077,014, 6,840,109, 6,516,674, 6,082,202, 6,006,609, 5,531,126, 5,381,697, 5,287,754 or Published International Application WO A 00/02020, measuring transducers of the type being discussed can be formed quite easily by means of only a single measuring tube in such a manner that the particular measuring transducer—, for instance, in contrast to that shown in U.S. Pat. No. 4,655,089—has, except for the mentioned measuring tube, no (other) tube adapted to guide a medium flowing in a lumen and, during that, to be caused to oscillate about a static resting position. As shown in the above mentioned U.S. Pat. No. 7,077,014, in the case of measuring transducers with a single, point symmetric, measuring tube, among other things, also such an oscillatory mode can be actively excited as wanted mode, consequently such oscillations can be selected as wanted oscillations, in the case of which the measuring tube has, in each case, four oscillation nodes, consequently exactly three oscillation antinodes, wherein at least in the case of ideally uniformly formed measuring tube with homogeneous wall thickness and homogeneous cross section, consequently with an equally ideally homogeneous stiffness—and mass distribution—the four oscillation nodes lie in at least one imaginary projection plane of the measuring transducer on an imaginary oscillation axis imaginarily connecting the inlet-side and the outlet-side tube ends with one another, respectively such an imaginary projection plane is inside of the measuring transducer. In the case of measuring transducers with straight measuring tube, the projection plane corresponds practically to a cutting plane cutting the measuring tube imaginarily into two halves, consequently an imaginary bend line representing the wanted oscillations of the measuring tube is coplanar with this projection plane.

Such measuring transducers offered most often with a nominal diameter lying in the range between 0.5 mm and 100 mm and having only a single measuring tube, consequently with only a single tube, through which medium flows, are usually—, for instance, also for preventing, respectively minimizing, undesired, not least of all also transverse, forces dependent on the density of the medium to be measured, respectively, disturbances of the measuring effect associated therewith—supplementally to the aforementioned outer support element, equipped with an additional, inner, support element, which is oscillatably coupled, namely affixed to the measuring tube only with an inlet-side support end and with an outlet-side support end spaced therefrom, consequently is mechanically coupled with its first support end also with the first support end of the outer support element, respectively with its second support end with the second support end of the outer support element. The inner support element is, in such case, furthermore, so embodied and arranged that it is spaced laterally from the measuring tube, as well as also from the outer support element, and that both the inlet-side as well as also the outlet-side support ends of the inner support element are, in each case, spaced from both of the support ends of the outer support element. In the case of such an arrangement of the inner support element on the measuring tube, there extends both between the inlet-side support ends of the two support elements as well as also between the outlet-side support ends of the two support elements, in each case, a free, for example, also straight, tube segment of the measuring tube acting as a spring element between both support elements and allowing movements of the respectively associated support ends of the inner support element relative to the support ends of the outer support element. As a result of this, the measuring transducer enjoys also an oscillatory mode exhibiting most often a resonant frequency different from the wanted frequency and characterized by movement of the entire inner support element relative to the outer support element, in such a manner that also the two support ends of the inner support element are moved relative to the two support ends of the outer support element. In other words, conventional measuring transducers with only a single measuring tube have most often, formed by means of the measuring tube and the inner support element held thereto, an inner part, which is held—, for example, also exclusively—by means of the two free tube segments in the outer support element, and, indeed, in a manner enabling oscillations of the inner part relative to the outer support element.

The inner support element composed most often of a steel, for example, a stainless steel or a free-machining steel, is usually embodied as a hollow cylinder at least sectionally enveloping, for example, also coaxial with, the measuring tube or, such as shown, among other things, in the above mentioned U.S. Pat. Nos. 7,077,014 or 5,287,754, for instance, also as a plate, frame or box, and has additionally also a mass, which is most often greater than a mass of the single measuring tube. As shown, among other things, in the above mentioned U.S. Pat. No. 5,531,126, the inner support element can, however, also be formed by means of a blind tube extending parallel to the measuring tube and, in given cases, also essentially equally constructed thereto as regards material and geometry.

For active exciting of the wanted oscillations, measuring transducers of vibration-type have, additionally, at least one electro-mechanical oscillation exciter acting most often centrally on the measuring tube and driven during operation by an electrical driver signal generated by the mentioned driver electronics and correspondingly conditioned to have a signal frequency corresponding to the wanted frequency, e.g. with a controlled electrical current. The oscillation exciter, usually embodied as a type of oscillation coil and, consequently, being of electro-dynamic type, includes most often a first exciter component affixed externally on the measuring tube, namely on a side of the measuring tube not contacted during operation by the medium to be measured, for example, mounted on its tube wall and formed by means of a rod-shaped, permanent magnet, as well as an oppositely placed, second exciter component interacting with the first exciter component. The oscillation exciter serves to convert an electrical power fed by means of the driver signal into a corresponding mechanical power and thereby to generate the exciter forces effecting the wanted oscillations of the measuring tube. In the case of the aforementioned measuring transducers with only a single tube, the second exciter component, which is most often formed by means of a cylindrical coil and, consequently, connected with electrical connecting lines, is usually placed on the inner support element, so that the oscillation exciter acts differentially on support element and measuring tube, so that the inner support element can, during operation, execute oscillations, which are embodied opposite-equally relative to those of the measuring tube, thus with equal frequency and opposite phase.

As, among other things, provided in the above mentioned U.S. Pat. No. 5,531,126, the oscillation exciter in the case of conventional measuring transducers of vibration-type can, however, also be so embodied that it acts differentially on the inner and outer support elements, and, consequently, excites the wanted oscillations of the measuring tube indirectly.

For registering inlet-side and outlet-side oscillations of the measuring tube, not least of all also those with the wanted frequency, measuring transducers of the type being discussed have, furthermore, two oscillation sensors, which are, most often, equally constructed. These work usually according to the same principle of action as the oscillation exciter. Of these oscillation sensors, an inlet-side oscillation sensor is located between the oscillation exciter and the inlet-side tube end of the measuring tube and an outlet-side oscillation sensor between the oscillation exciter and an outlet-side tube end of the measuring tube. Each of the oscillation sensors, for example, electro-dynamic, oscillation sensors, serves to convert oscillatory movements of the measuring tube into an oscillatory signal representing oscillations of the measuring tube. For example, the oscillatory signal can be a measurement voltage dependent on the wanted frequency as well as an amplitude of the oscillatory movements. For such purpose, each of the oscillation sensors includes a first sensor component affixed externally on the measuring tube, for example, connected with its tube wall by material bonding and/or formed by means of a permanent magnet, as well as a second sensor component placed opposite the first sensor component and interacting with the first sensor component. In the case of the aforementioned measuring transducers with only a single tube, the second sensor component, which is most often formed by means of a cylindrical coil and is, consequently, connected with electrical connecting lines, is usually placed on the inner support element, in such a manner that each of the oscillation sensors differentially registers movements of the measuring tube relative to the second support element.

In the case of measuring transducers of the type being discussed, it is, such as, among other things, also mentioned in U.S. Pat. No. 6,047,457 or US-A 2003/0084559, additionally usual to hold the exciter—or sensor component affixed to the measuring tube, in each case, to an extra ring—or annular washer shaped, metal securement element, which is applied on the particular measuring tube and which solidly clamps around the measuring tube, in each case, essentially along one of its imaginary, circularly shaped, peripheral lines. The securement element can be affixed to the measuring tube, for example, by material bonding, for instance by soldering or brazing, and/or by force interlocking, e.g. frictional interlocking, for instance, by pressing externally, by hydraulic pressing or rolling from within the measuring tube or by thermal shrinking, for example, also in such a manner that the securement element is subjected durably to elastic or mixed plastic, elastic deformations and, as a result, is permanently radially prestressed relative to the measuring tube.

A disadvantage of measuring transducers with only a single measuring tube is—besides the frequently very complicated measures for balancing such measuring transducers also over greater density measuring ranges—is to be seen, among other things, in the fact that the measuring transducers react in comparison to measuring transducers with two measuring tubes significantly more sensitively (with movements corrupting the at least one oscillatory signal) to axial clamping forces impressed via a connected pipeline and transferred via the external support element, respectively to shaking forces impressed via the pipeline, and, consequently, have a smaller immunity to such disturbances introduced externally of the measuring transducer, respectively exhibit a comparatively poor mechanical common-mode suppression; this, especially, also for the case, in which the aforementioned shaking forces are in considerable measure directed parallel to the exciter forces driving the wanted oscillations and/or have a force component having the wanted frequency. As a result of this, measuring transducers with only a single measuring tube can, as well as also already discussed in the above mentioned U.S. Pat. No. 5,736,653, in the case of an installation unfavorable in the aforementioned sense, have, at times, increased measuring errors as a result of corrupted oscillation signals.

SUMMARY OF THE INVENTION

Starting from the above-described disadvantages arising especially in the case of measuring transducers known from the state of the art with only a single measuring tube, an object of the invention is so to improve measuring transducers of the vibration-type that their immunity to disturbances introduced externally of the measuring transducer, for instance in the form of clamping and/or shaking forces, is increased.

For achieving the object, the invention resides in a measuring transducer of the vibration-type, especially for a Coriolis mass flow measuring device, wherein the measuring transducer comprises:

a measuring tube having an inlet-side first tube end and an outlet-side second tube end, for example, a measuring tube point symmetric relative to a symmetry center and/or curved in at least sectionally S, respectively Z, shape and/or an at least sectionally straight and/or single measuring tube, having a tube wall having a predetermined wall thickness and a lumen surrounded by the tube wall and extending between the first and second tube ends, a first support element, e.g. an at least sectionally cylindrical first support element and/or a first support element embodied as a housing jacketing the measuring tube, wherein the first support element is with a first support end connected mechanically, especially rigidly, with the first tube end of the measuring tube and with a second support end connected mechanically, especially rigidly, with the second tube end of the measuring tube, a second support element, e.g. one formed by means of a blind tube constructed equally to the measuring tube and/or extending at least sectionally parallel to the measuring tube, wherein the second support element is laterally spaced from the measuring tube and is mechanically connected, especially rigidly, via a first support end with the first support end of the first support element as well as also via a second support end with the second support end of the first support element, an oscillation exciter, for example, a single and/or electrodynamic oscillation exciter, as well as at least a first oscillation sensor, for example, an electrodynamic, first oscillation sensor. The measuring tube is adapted to guide in its lumen a flowing medium, for example, a gas and/or a liquid, and during that to be caused to oscillate about a static resting position for producing Coriolis forces, wherein the measuring transducer has a wanted mode having a resonant frequency, namely an oscillatory mode, in which the measuring tube can execute wanted oscillations, namely oscillations about its static resting position suitable for producing Coriolis forces and having a wanted frequency, namely a frequency corresponding to the resonant frequency of the wanted mode, for example, also in such a manner that the wanted oscillations of the measuring tube have four oscillation nodes, consequently three oscillation antinodes, and wherein the oscillation exciter is adapted to excite the wanted oscillations of the measuring tube. Additionally, the first oscillation sensor of the measuring transducer of the invention is adapted to register movements of the measuring tube relative to the second support element, for example, movements of oscillations of the measuring tube with the wanted frequency, and to convert such into a first oscillatory signal representing oscillations of the measuring tube. For such purpose, the oscillation sensor includes a first sensor component affixed externally on the measuring tube, for example, a first sensor component also connected with the tube wall by material bonding and/or formed by means of a permanent magnet as well as a second sensor component mounted on the second support element, for example, a second sensor component formed by means of a cylindrical coil.

Moreover, the invention resides in a measuring system, especially for measuring a mass flow rate and/or a mass flow of a medium flowing in a pipeline, which measuring system comprises such a measuring transducer as well as a measuring—and operating electronics electrically connected to the measuring transducer.

In a first embodiment of the invention, it is provided that the oscillation exciter has a first exciter component affixed externally on the measuring tube, for example, connected with its tube wall by material bonding and/or formed by means of a permanent magnet, and a second exciter component mounted on the first support element, for example, placed on an inner side of said support element facing the measuring tube and/or formed by means of a cylindrical coil. Especially, it is, in such case, further provided that the measuring transducer, except for the oscillation exciter, has no oscillation exciter with an exciter component mounted on the first support element and/or no oscillation exciter with an exciter component mounted on the second support element.

In a second embodiment of the invention, it is provided that the first support element is formed by means of a hollow body, for example, an at least sectionally cylindrical and/or tubular hollow body and/or a hollow body at least partially enveloping both the measuring tube as well as also the second support element.

In a third embodiment of the invention, it is provided that the first support element has a lumen, through which both the measuring tube as well as also the second support element extend.

In a fourth embodiment of the invention, it is provided that the first support element has a first endpiece forming the first support end, a second endpiece forming the second support end as well as an intermediate piece, for example, a cylindrical and/or tubular intermediate piece, extending between the two endpieces, for example, equally-constructed endpieces, for example, an intermediate piece forming a hollow body at least partially enveloping both the measuring tube as well as also the second support element.

In a fifth embodiment of the invention, it is provided that the first support element has a greatest flexibility, which is less than a greatest flexibility of the measuring tube.

In a sixth embodiment of the invention, it is provided that the first support element has a maximum flexibility, which is less than a maximum flexibility of the second support element.

In a seventh embodiment of the invention, it is provided that the first support element is formed by means of a cylindrical tube having a tube wall and a lumen surrounded by the tube wall, for example, in such a manner that measuring tube and second support element are, in each case, arranged, at least partially, within a lumen of the tube, and/or that a wall thickness of the tube wall of the tube forming the first support element is greater than the wall thickness of the tube wall of the measuring tube, wherein a wall thickness of the tube wall of the tube forming the first support element is greater than the wall thickness of the tube wall of the measuring tube, for example, in such a manner that the wall thickness of the tube wall of the tube forming the first support element is more than twice as large as the wall thickness of the tube wall of the measuring tube, and/or that the wall thickness of the tube wall of the measuring tube is greater than 0.5 mm and less than 3 mm and the wall thickness of the tube wall of the tube forming the first support element is greater than 3 mm.

In an eighth embodiment of the invention, it is provided that the measuring transducer, except for the measuring tube, has no tube, which is adapted to guide a medium flowing in a lumen and during that to be caused to oscillate about a static resting position.

In a ninth embodiment of the invention, the first support end of the first support element has a connecting flange, into which the first tube end of the measuring tube opens, and the second support end of the first support element has a connecting flange (F#), into which the second tube end of the measuring tube opens.

In a tenth embodiment of the invention, the first support element is adapted to be inserted into the course of a pipeline, in such a manner that the lumen of the measuring tube communicates with a lumen of the pipeline to form a flow path.

In an $11^{th}$ embodiment of the invention, it is provided that the resonant frequency of the wanted mode depends on a density, for example, a time variable density, of the medium guided in the measuring tube.

In a $12^{th}$ embodiment of the invention, the measuring transducer has a plurality of disturbance modes of first type having, in each case, a resonant frequency, namely oscillation modes, in which the first support element can, in each case, execute disturbing oscillations, namely, in each case, oscillations effecting movements about its static resting position relative to the measuring tube, as well as a plurality of disturbance modes of second type having, in each case, a resonant frequency, namely oscillation modes, in which the second support element can, in each case, execute disturbing oscillations, namely, in each case, oscillations effecting movements about its static resting position relative to the measuring tube, and the measuring transducer is embodied in such a manner that the resonant frequencies both of each of the disturbance modes first type as well as also each of the disturbance modes of second type, for example, deviate durably from the resonant frequency of the wanted mode, for example, by, in each case, more than 2 Hz. Especially, it is provided that the measuring transducer has similarly to the wanted mode a first disturbance mode of second type, in which the second support element can execute disturbing oscillations, which have exactly as many oscillation antinodes and oscillation nodes as one of the wanted oscillations of the measuring tube, and a resonant frequency, which is less than the resonant frequency of the wanted mode.

In a $13^{th}$ embodiment of the invention, it is provided that the wanted frequency is, for instance, as a result of time changes of a density of a medium flowing in the lumen of the measuring tube, variable within a wanted frequency interval, especially in such a manner that a first, wanted mode similar, disturbance mode of the measuring transducer, in which the second support element can execute disturbing oscillations, which have exactly as many oscillation antinodes and oscillation nodes as one of the wanted oscillations of the measuring tube, has a resonant frequency, which is less than, for example, by more than 2 Hz, a lower interval boundary of the wanted frequency interval defined by a smallest frequency value not subceeded by the wanted frequency, and/or in such a manner that a second disturbance mode of the measuring transducer, in which the second support element can execute disturbing oscillations, which have one oscillatory antinode more, consequently one oscillation node more than the wanted oscillations of the measuring tube, has a resonant frequency, which is greater, for example, by more than 2 Hz, than an upper interval boundary of the wanted frequency interval defined by a greatest frequency value not exceeded by the wanted frequency.

In a $14^{th}$ embodiment of the invention, it is provided that the wanted oscillations of the measuring tube have exactly four oscillation nodes, consequently exactly three oscillation antinodes. Furthermore, the measuring transducer is so embodied that a resonant frequency of a measuring transducer disturbance mode, in which the second support element can execute disturbing oscillations, which have one oscillatory antinode less, consequently one oscillation node less, than the wanted oscillations of the measuring tube, is less, for example, by more than 2 Hz, than a lower interval boundary of a wanted frequency interval, within which the wanted frequency is variable, for instance, as a result of time changes of a density of a medium flowing in the lumen of the measuring tube.

In a 15$^{th}$ embodiment of the invention, it is provided that the measuring tube and the second support element are adapted to react to a disturbance oscillation transmittable externally via the first support element, for example, namely via the first support end of the first support element and/or via the second support end of the first support element, at the same time to the measuring tube and to the second support element and having a disturbance frequency, for example, a disturbance frequency corresponding to the resonant frequency of the wanted mode, with a parallel oscillation, namely, in each case, with an oscillation not changing a separation between the first and second sensor components and having, in each case, a frequency corresponding to the disturbance frequency.

In a 16$^{th}$ embodiment of the invention, it is provided that the first support end of the first support element and the first support end of the second support element are rigidly connected with one another, namely in a manner impeding relative movements of the first support end of the first support element and the first support end of the second support element, and that the second support end of the first support element and the second support end of the second support element are rigidly connected with one another, namely in a manner impeding relative movements of the second support end of the first support element and the second support end of the second support element.

In a 17$^{th}$ embodiment of the invention, it is provided that the first support end of the first support element is equally rigidly connected with the first tube end of the measuring tube as well as with the first support end of the second support element, and that the second support end of the first support element is equally rigidly connected with the second tube end of the measuring tube as well as with the second support end of the second support element.

In an 18$^{th}$ embodiment of the invention, it is provided that the first support end of the first support element is mechanically connected with the first tube end of the measuring tube and with the first support end of the second support element in a manner impeding movements of the first tube end of the measuring tube relative to the first support end of the second support element, and that the second support end of the first support element is mechanically connected with the second tube end of the measuring tube and with the second support end of the second support element in a manner impeding movements of the second tube end of the measuring tube relative to the second support end of the second support element.

In a 19$^{th}$ embodiment of the invention, it is provided that the measuring tube and the second support element extend parallel to one another, for example, in such a manner that a minimal separation between the measuring tube and the support element is constant at least over a region extending between the first oscillation sensor and the oscillation exciter.

In a 20$^{th}$ embodiment of the invention, it is provided that the measuring tube is at least sectionally S-, respectively Z-shaped and/or at least sectionally straight.

In a 21$^{st}$ embodiment of the invention, it is provided that the second support element is at least sectionally S-, respectively Z-shaped and/or at least sectionally straight In a 22$^{nd}$ embodiment of the invention, it is provided that the second support element is formed by means of a cylindrical tube having a tube wall and a lumen surrounded by the tube wall, for example, in such a manner that the lumen of the measuring tube and the lumen of the tube forming the second support element are equally large, and/or that a wall thickness of the tube wall of the tube forming the second support element and the wall thickness of the tube wall of the measuring tube are equally large.

In a 23$^{rd}$ embodiment of the invention, it is provided that the measuring tube has a symmetry center, relative to which the measuring tube is point symmetric.

In a 24$^{th}$ embodiment of the invention, it is provided that the measuring tube has a symmetry center, relative to which the measuring tube is point symmetric, and that the second support element likewise has a symmetry center, relative to which the second support element is point symmetric; this, especially, in such a manner that the symmetry center of the measuring tube and the symmetry center of the second support element coincide at least in an imaginary projection plane of the measuring transducer extending between the measuring tube and the second support element, for example, an imaginary projection plane parallel to the measuring tube and/or to the second support element.

In a first further development of the invention, the measuring transducer further comprises: a second oscillation sensor, for example, an electrodynamic second oscillation sensor and/or a second oscillation sensor constructed equally to the first oscillation sensor, wherein the second oscillation sensor has a first sensor component spaced from the first sensor component of the first oscillation sensor and affixed externally on the measuring tube, for example, a first sensor component connected with its tube wall by material bonding and/or formed by means of a permanent magnet and/or constructed equally to the first sensor component of the first oscillation sensor, and the second oscillation sensor has a second sensor component spaced from the second sensor component of the first oscillation sensor and mounted on the second support element, for example, a second sensor component formed by means of a cylindrical coil and/or constructed equally to the second sensor component of the first oscillation sensor. The second oscillation sensor is, especially, furthermore, adapted to register movements of the measuring tube relative to the second support element, for example, movements of oscillations of the measuring tube with the wanted frequency, and to convert such into a second oscillatory signal representing oscillations of the measuring tube, for example, in such a manner that a phase difference between the first and second sensor signals corresponding to a mass flow rate of a medium flowing in the lumen of the measuring tube is measurable.

In a second further development of the invention, the measuring transducer further comprises:
a spring element mechanically coupled both with the measuring tube as well as also with the first support element, for example, a spring element formed by means of a leaf spring, wherein the spring element is adapted, as a result of movement of the measuring tube relative to the first support element, to be elastically deformed.

In a third further development of the invention, the measuring transducer further comprises:
a trimming weight applied on the second support element, for example, on a side of the support element facing away from the measuring tube.

A basic idea of the invention is to improve the immunity of measuring transducers of vibration-type to disturbances introduced from the exterior of the measuring transducer. To this end, with omission of the otherwise most often provided, free tube segments between measuring tube in the case of conventional measuring transducers with only a single measuring tube, both the measuring tube as well as also the inner support element are mechanically directly connected with the outer support element, whereby measuring tube and inner support element react to external disturbances, consequently disturbances introduced via the external support element, thus disturbances of the type being discussed, in, in each case, equal manner with corresponding deviations, respectively oscillatory movements, in such a manner that, as a result, the inner support element executes no oscillatory movements relative to the measuring tube with an oscillation frequency corresponding to the wanted frequency as a result of external disturbances.

The invention is based, among other things, on the surprising recognition that, on the one hand, disturbances of the aforementioned type are in not insignificant measure also attributable to the fact that the inner part, formed, in the case of conventional measuring transducers with only a single measuring tube, most often by means of the measuring tube and the inner support element held thereon and—not least of all for the purpose of balancing—additionally held by means of two free tube segments oscillatably in the outer support element, transforms disturbances of the aforementioned type, at times, also into opposite-equal disturbing oscillations of the inner support element and measuring tube, consequently into disturbing oscillations detectable by means of the at least one oscillation sensor, with the result that the at least one oscillatory signal accordingly has an additional disturbance component. On the other hand, however, such disturbance components—in the most unfavorable case even disturbance components having a signal frequency corresponding to the wanted frequency, consequently disturbance components no longer distinguishable from the actual wanted signal—can be surprisingly effectively prevented, consequently a mechanical common-mode suppression of measuring transducers of the type being discussed can be significantly improved, by connecting the measuring tube and the two support elements at their respective corresponding first, respectively their corresponding second, ends solidly with one another, and, indeed, in a manner as much as possible completely excluding relative movements of the mentioned ends. Possible imbalances in the so formed measuring transducer, for instance, as a result of time changing density of the medium guided in the measuring tube, can, in such case, be lessened in very simple manner when the measuring tube, such as already provided in the above mentioned U.S. Pat. No. 7,077,014, has during operation, e.g. is excited to such wanted oscillations, the exactly three oscillation antinodes.

BRIEF DESCRIPTION OF THE DRAWINGS

The invention as well as other advantageous embodiments thereof will now be explained in greater detail based on examples of embodiments shown in the figures of the drawing. Equal parts are provided in all figures with equal reference characters; when perspicuity requires or it otherwise appears sensible, already presented reference characters are omitted in subsequent figures. Other advantageous embodiments or further developments, especially also combinations, first of all, of only individually explained aspects of the invention, result, furthermore, from the figures of the drawing, as well as also from the dependent claims per se. The figures of the drawing show as follows:

FIGS. 4, 5 and 6 are different side views of a measuring transducer of FIG. 2, and FIG. 3;

DETAILED DISCUSSION IN CONJUNCTION WITH THE DRAWINGS

Figure 8:
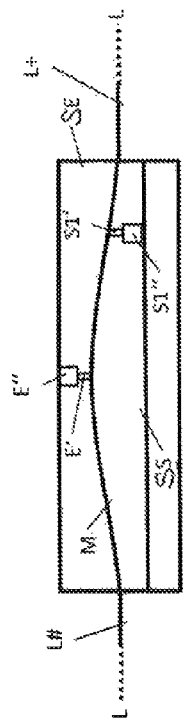
FIG. 8 is schematically, an oscillation form of a measuring transducer according to FIG. 2, and FIG. 3.
Figure 9:
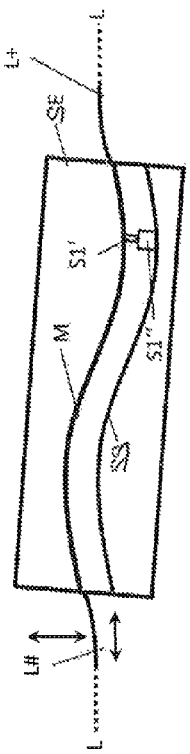
FIG. 9 is schematically, an oscillation form of a measuring transducer according to FIG. 2, and FIG. 3.
Figure 6:
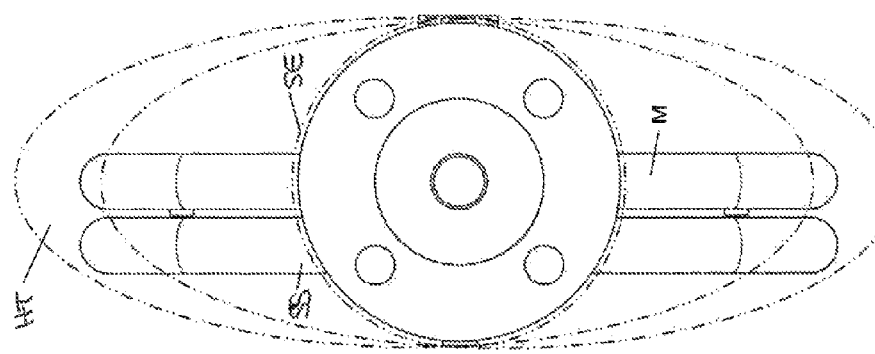

FIGS. 1 to 6 show in different views a measuring system for ascertaining a mass flow, namely a total mass flow during a predeterminable or earlier determined measurement interval and/or a mass flow rate of a medium, especially a liquid or a gas, flowing in a pipeline L only schematically illustrated in FIG. 8, and FIG. 9. The measuring system comprises a measuring transducer of vibration-type flowed through during operation by the medium, as well as a measuring and operating electronics ME (shown here only in FIG. 1) for producing measured values representing the mass flow rate, respectively the mass flow, respectively for outputting such a measured value as a currently valid measured value of the measuring system on a corresponding measurement output of the measuring and operating electronics ME.

Figure 1:
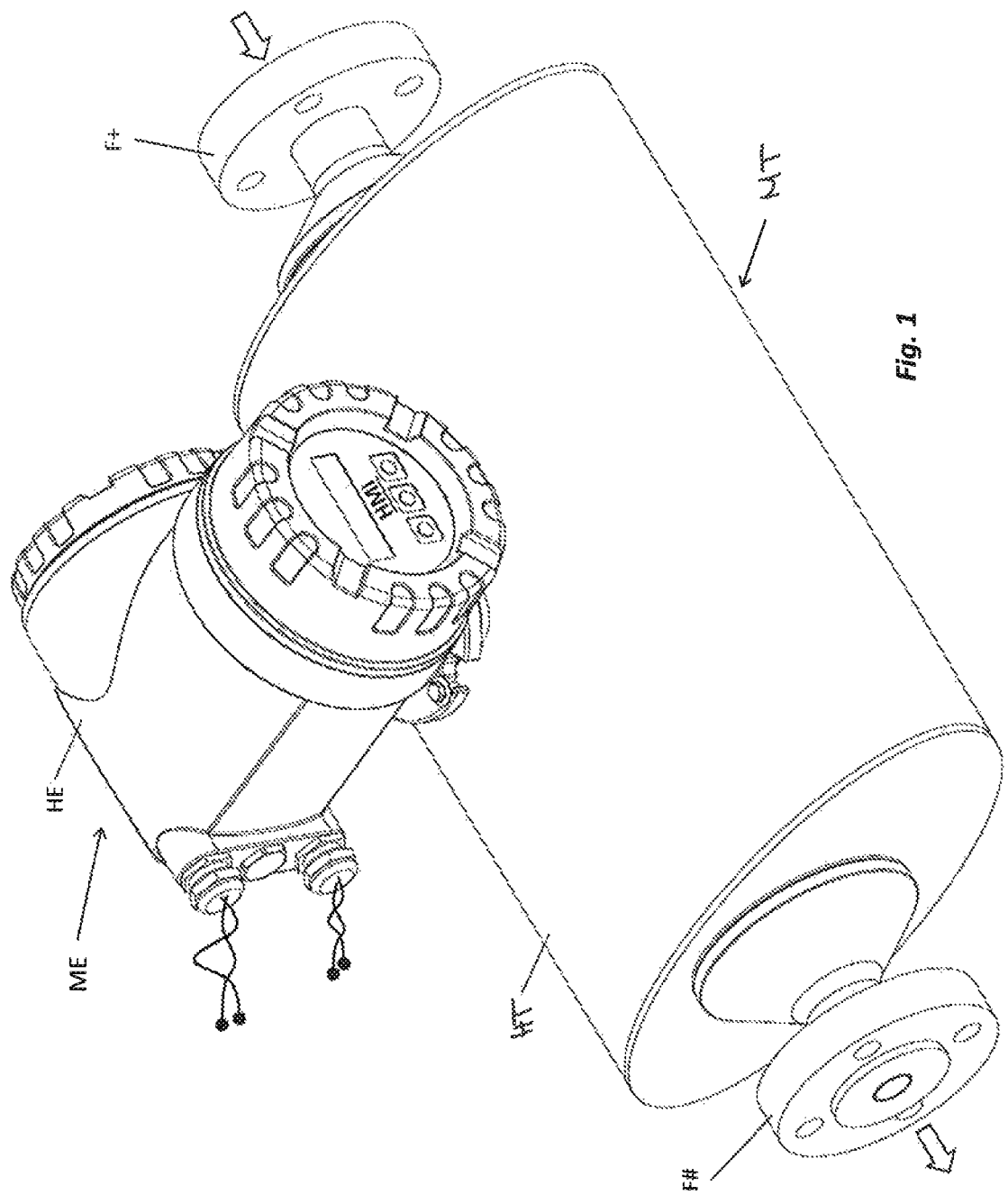
FIG. 1 is in a perspective side view, especially for application in industrial measuring—and automation technology, a measuring system comprising a measuring transducer of vibration-type in a measuring transducer housing and a measuring—and operating electronics accommodated in an electronics housing secured on the measuring transducer housing.

The measuring—and operating electronics ME, formed e.g. by means of at least one microprocessor and/or by means of a digital signal processor (DSP), can, such as indicated in FIG. 1, be accommodated in a single electronics housing HE of the measuring system.

The measured values X generated by means of the measuring—and operating electronics ME can be displayed, for example, on-site, namely directly at the measuring point formed by means of the measuring system. For visualizing measured values internally produced by the measuring system and/or, in given cases, measuring system internally generated, system status reports, such as, for instance, an error report or an alarm, on-site, the measuring system can, as also indicated by FIG. 1, have, for example, a display—and interaction element HMI communicating with the measuring—and operating electronics, and can, in given cases, also be portable. Thus, the HMI element can be embodied as, for instance, an LCD-, OLED- or TFT display placed behind a window correspondingly provided in the electronics housing HE, as well as a corresponding input keypad and/or touch screen. In advantageous manner, the measuring—and operating electronics, for example, also a (re-)programmable-, respectively remotely parameterable, measuring—and operating electronics, can additionally be so designed that it can during operation of the measuring system exchange with an electronic data processing system, for example, a programmable logic controller (PLC), a personal computer and/or a work station, superordinated to it, via a data transmission system, for example, a fieldbus system and/or wirelessly per radio, measuring—and/or other operating data, such as, for instance, current measured values, system diagnosis values or, however, also setting values serving for control of the measuring device. Furthermore, the measuring—and operating electronics ME can be so designed that it can be fed from an external energy supply, for example, also via the aforementioned fieldbus system. For the case, in which the measuring system is provided for coupling to a fieldbus—or other communication system, the measuring—and operating electronics ME, for example, also a measuring—and operating electronics ME (re-)programmable on-site and/or via a communication system, can have a corresponding communication interface for a data communication, especially conforming to relevant industry standards, e.g. for sending measuring—and/or operating data, for instance, measured values representing the mass flow or the mass flow rate, to a programmable logic controller (PLC) or to a superordinated process control system and/or for receiving settings data for the measuring system. Moreover, the measuring—and operating electronics ME can have, for example, an internal energy supply circuit, which is fed during operation via the aforementioned fieldbus system from an external energy supply provided in the aforementioned data processing system. In such case, the measuring system can be embodied, for example, as a so-called four-conductor measuring device, in the case of which the internal energy supply circuit of the measuring—and operating electronics ME can be connected with an external energy supply by means of a first pair of lines and the internal communication circuit of the measuring—and operating electronics ME can be connected with an external data processing circuit or an external data transmission system by means of a second pair of lines.

The measuring transducer is formed by means of a measuring tube M, which has an inlet-side, first tube end M+ and an outlet-side, second tube end M#, a tube wall having a predetermined wall thickness and a lumen extending between the first and second tube ends and surrounded by the tube wall. The measuring tube M is especially adapted, during operation of the measuring system, to guide in its lumen, communicating with a lumen of the connected pipeline to form a traversing flow path, a flowing medium, for example, a gas and/or a liquid, and during that to be caused to oscillate about a static resting position for producing Coriolis forces, wherein the measuring transducer according to an embodiment of the invention, except for the measuring tube M, has no (other) tube, which is adapted to guide a flowing medium in a lumen and during that to be caused to oscillate about a static resting position. Especially, the measuring tube M is, such as usual in the case of measuring systems of the type being discussed, additionally, furthermore, embodied to be inserted directly into the course of the pipeline L and so, for such purpose, to be connected on an inlet-side to the first line segment L+ of the pipeline L and on an outlet-side to the second line segment L# of the pipeline, such that the lumen of the measuring tube communicates with a respective lumen of each of the two line segments L+, L# and a flow path enabling flow from the first line segment L+, further through the measuring tube M, to the second line segment L# is formed. The measuring tube M can, such as usual in the case of such measuring transducers, be manufactured, for example, of a metal tube, for example, a one-piece metal tube of a stainless steel or also a titanium, tantalum- and/or zirconium alloy, and have, for example, a caliber of greater than 0.5 mm, especially also greater than 20 mm.

Besides the measuring tube M, the measuring transducer also comprises a first support element SE, which with a first support end SE+ is mechanically connected with the tube end M+ of the measuring tube M and with a second support end SE# with the tube end M# of the measuring tube M, as well as, laterally spaced from the measuring tube and, for example, formed by means of a blind tube constructed equally to the measuring tube M and/or extending at least sectionally parallel to the measuring tube M, a second support element SS, which both with a first support end SS+ as well as also with a second support end SS# is mechanically coupled with the support element SE. The support element SE is, among other things, also embodied to be inserted into the course of the pipeline L in such a manner that the lumen of the measuring tube communicates with a lumen of the pipeline to form the flow path, as well as to be so connected mechanically with the pipeline that, as a result, the entire measuring transducer MT is held in the pipeline; this, especially, also in such a manner that mechanical loadings, especially clamping forces, respectively torques, introduced from the pipeline are absorbed predominantly by the support element SE and, consequently are kept largely away from the other components of the measuring transducer MT. For connecting support element SE together with the measuring tube M to the pipeline, such as quite usual in the case of such measuring transducers, each of the support ends SE+, SE# of the support element SE can, in each case, have a corresponding connection flange F+, respectively F#, into which, in each case, a corresponding tube end M+, respectively M#, of the measuring tube M opens.

As apparent from FIGS. 2-5, and 8 or 9, the measuring transducer further comprises at least one oscillation exciter E electrically connectable to the measuring and operating electronics ME by means of a pair of connection wires (not shown) and correspondingly operable by the measuring and operating electronics ME, for example, also a single oscillation exciter E, for exciting mechanical oscillations of the measuring tube M, and, indeed, in such a manner that the measuring tube M executes, at least partially, wanted oscillations, namely oscillations suitable for producing Coriolis forces around its static resting position with a wanted frequency, namely a frequency corresponding to the resonant frequency of a natural oscillatory mode of the measuring transducer and referred to in the following as the drive—or also as the wanted mode.

Figure 7:
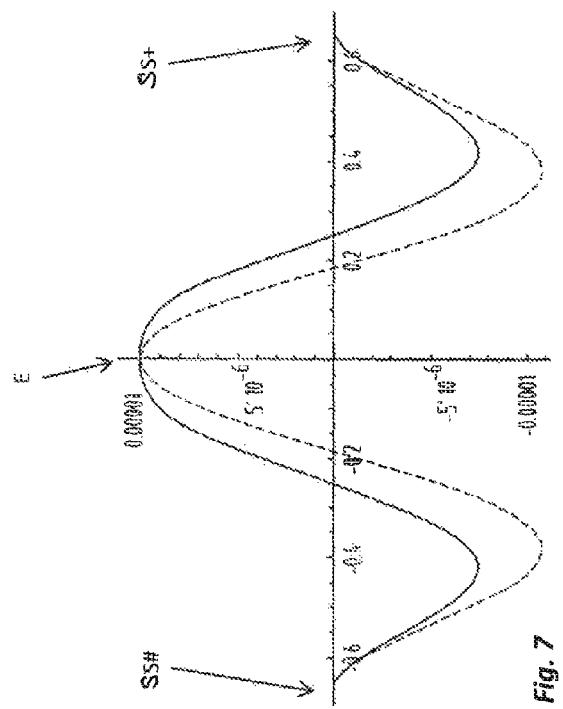
FIG. 7 are schematically, oscillation forms of a measuring tube of a measuring transducer according to FIG. 2, and FIG. 3.

In the example of an embodiment shown in FIGS. 1-6, a corresponding oscillatory length, namely a section of the measuring tube M actually executing wanted oscillations, extends from the support end SS+ to the support end SS# of the support element SS. Especially, in such case, such a natural oscillatory mode of the measuring transducer MT is selected as wanted mode, consequently during operation such resonant oscillations of the measuring transducer MT are excited as wanted oscillations, which have, on the one hand, an as high as possible sensitivity to the mass flow rate of the flowing medium and whose resonant frequency, on the other hand, depends also in high measure also on a density p, typically also a time variable density p, of the medium guided in the measuring tube, and consequently enable a high resolution of both slight fluctuations of the mass flow rate as well as also slight fluctuations of the density of the medium. In the case of the measuring transducer shown here, for example, proved as especially suitable for application as wanted oscillations of the measuring tube M about an imaginary oscillation axis imaginarily connecting its two tube ends M+, M# are bending oscillations, which, such as schematically shown in FIG. 7, have over the entire oscillatory length of the measuring tube exactly four oscillation nodes, consequently exactly three oscillation antinodes. In an additional embodiment of the invention, the oscillation exciter E is, consequently, adapted to excite as wanted oscillations of the measuring tube M such oscillations, which, such as schematically shown in FIG. 7, have three oscillation antinodes, and, consequently, four oscillation nodes. The latter lie in at least one imaginary projection plane of the measuring transducer on the mentioned imaginary oscillation axis imaginarily connecting the two tube ends M+, M# with one another.

As a result of Coriolis forces produced by means of the wanted oscillations of the measuring tube flowed-through by the medium, the measuring tube executes supplementally to the wanted oscillations also Coriolis oscillations, namely oscillations about its static resting position inducible, respectively induced, by Coriolis forces and having a frequency corresponding to the wanted frequency. Said Coriolis oscillations can correspond, for example, to a natural oscillatory mode equally inherent to the measuring transducer, however, having a resonant frequency deviating from the resonant frequency of the wanted mode and causing the measuring tube to execute oscillations, for example, bending oscillations, about the oscillation axis with, respectively, one oscillatory antinode and one oscillation node more or, however, also, for instance, for the aforementioned case, in which the wanted oscillations have four oscillation nodes and three oscillation antinodes, with, in each case, one oscillatory antinode and one oscillation node less than the wanted oscillations.

For registering oscillations of the measuring tube M, not least of all also the wanted—, respectively the Coriolis, oscillations, the measuring transducer further comprises a first oscillation sensor S1, for example, electrically connectable to the measuring—and operating electronics by means of an additional pair of connection wires (not shown), especially an electrodynamic, first oscillation sensor S1. The oscillation sensor S1 is, in such case, specially embodied, in order to register movements of the measuring tube M relative to the support element SS, not least of all also movements of oscillations of the measuring tube with the wanted frequency, and to convert such into a first oscillatory signal representing oscillations of the measuring tube. The first oscillatory signal has, in turn, a signal frequency corresponding to the wanted frequency. For such purpose, the oscillation sensor S1 includes, such as also shown schematically in FIG. 3, a first sensor component S1' affixed externally on the measuring tube M, for example, connected by material bonding with its tube wall and/or formed by means of a permanent magnet, as well as a second sensor component S1" mounted on the support element SS and formed, for example, by means of a cylindrical coil.

The oscillation exciter E can, such as evident from FIGS. 2-5, be formed, for example, by means of a first exciter component E' affixed externally on the measuring tube M, for example, also a first exciter component E' connected with its tube wall by material bonding, as well as by means of a second exciter component E" mounted on the support element SE—here namely placed on an inner side of the support element SE facing the measuring tube, whereby, for example, also an efficiency, with which the wanted oscillations are excitable, can be improved, in that, as well as also shown schematically in FIG. 8, the so formed oscillation exciter converts practically no mentionable excitation power into oscillations of the support element SS not usable for measuring the mass flow rate. For the mentioned case, in which the oscillation exciter E is an electrodynamic oscillation exciter, the exciter component E' can be formed, for example, by means of a permanent magnet and the exciter component E' by means of a cylindrical coil complementary to the permanent magnet. In an additional embodiment of the invention, it is, in such case, furthermore, provided that the measuring transducer, such as also evident from a combination of FIGS. 2-5, has, except for the oscillation exciter E, no oscillation exciter with an exciter component mounted on the support element SE, respectively on the support element SS.

The measuring—and operating electronics ME is not least of all also adapted to generate, at least at times, an electrical driver signal controlled, for example, to a predetermined voltage level and/or to a predetermined electrical current level for the oscillation exciter E, for example, an electrodynamic oscillation exciter E, namely one formed by means of plunging armature, or solenoid, coils, respectively implemented as an oscillation coil. Thus, the driver signal serves to feed the oscillation exciter E controllably at least with the electrical power required for exciting, respectively maintaining, the wanted oscillations, and has, accordingly, a signal frequency corresponding to the (instantaneous) resonant frequency of the wanted mode, consequently the wanted frequency. The oscillation exciter E, in such case, converts an electrical excitation power fed by means of the electrical driver signal into, e.g. pulsating or harmonic, namely essentially sinusoidal, exciter forces, which act correspondingly on the measuring tube and, thus, actively excite the desired wanted oscillations. For example, the driver signal can, in such case, simultaneously also have a plurality of sinusoidal signal components with signal frequencies different from one another, of which one, for instance, is, at least at times, as regards a signal power a dominating signal component, which has a signal frequency corresponding to the wanted frequency. The exciter forces ultimately generated by conversion of electrical excitation power fed into the oscillation exciter E can correspondingly be produced, in such case, in manner known, per se, to those skilled in the art, namely by means of a driver circuit provided in the measuring—and operating electronics ME and providing the driver signal via an output channel based on signal frequency and signal amplitude of the at least one sensor signal. For ascertaining the instantaneous resonant frequency of the wanted mode, respectively for tuning the corresponding signal frequency for the driver signal, there can be provided in the driver circuit, for example, a digital phase control loop (PLL or phase locked loop), while an electrical current level of the driver signal determinative of a magnitude of the exciter forces can be set suitably, for example, by means of a corresponding electrical current controller of the driver circuit. The measuring—and operating electronics can here also be embodied e.g. to control the driver signal in such a manner that the resonant oscillations have a constant amplitude, consequently are also largely independent of the density $\rho$, respectively also the viscosity $\eta$ of the respective medium to be measured. The construction and application of the aforementioned phase control loop for the active exciting of vibratory elements of the type being discussed to an instantaneous resonant frequency is described at length e.g. in U.S. Pat. No. 4,801,897. Of course, also other driver circuits known, per se, to those skilled in the art, for example, also from the above mentioned U.S. Pat. Nos. 4,801,897, 5,024,104, respectively U.S. Pat. No. 6,311,136, to be suitable for tuning the exciter energy, respectively the excitation power, can be used.

Moreover, the measuring—and operating electronics can, furthermore, also be adapted to measure a density and/or a viscosity of the medium, for instance, based on the oscillatory signal and/or based on the driver signal.

Although a registering of the wanted—, as well as also the Coriolis, oscillations, consequently a measuring of the mass flow rate, respectively of the mass flow, can be accomplished basically also by means of only one oscillation sensor, for example, by a phase measurement between the exciter signal driving the oscillation exciter E and the sensor signal delivered by the oscillation sensor S1, according to an additional embodiment of the invention, in the case of the measuring transducer of the invention, a second oscillation sensor S2, for example, again, an electrodynamic, second oscillation sensor S2, respectively a second oscillation sensor S2 constructed equally to the first oscillation sensor S1, is provided. This oscillation sensor includes, such as directly evident from a combination of FIGS. 3 and 5, a first sensor component S2' spaced from the sensor component S1' of the oscillation sensor S1 and affixed externally on the measuring tube M, for example, namely also one by formed means of a permanent magnet and/or constructed equally to the sensor component of the first oscillation sensor, as well as a second sensor component S2" spaced from the second sensor component S1" of the oscillation sensor S1 and mounted on the support element SS, for example, one formed by means of a cylindrical coil and/or constructed equally to the sensor component S1" of the oscillation sensor S1. Equally as in the case of the oscillation sensor S1, also the oscillation sensor S2 is adapted to register movements of the measuring tube M relative to the support element SS, for instance, also movements of oscillations of the measuring tube M with the wanted frequency, and to convert such into a second oscillatory signal representing oscillations of the measuring tube M, and having a signal frequency corresponding to the wanted frequency, consequently also equal to the signal frequency of the first oscillation signal; this, especially, also in such a manner that between the first and second sensor signals, corresponding to a mass flow rate of a medium flowing in the lumen of the measuring tube, a phase difference is measurable, based on which thus the measuring— and operating electronics ME can ascertain the mass flow rate, respectively the mass flow, of the medium. According to an additional embodiment of the invention, it is, furthermore, provided that the measuring transducer MT has except for the first and second oscillation sensors S1, S2 no (additional) oscillation sensor with a sensor component mounted on the support element SS.

Figure 2:
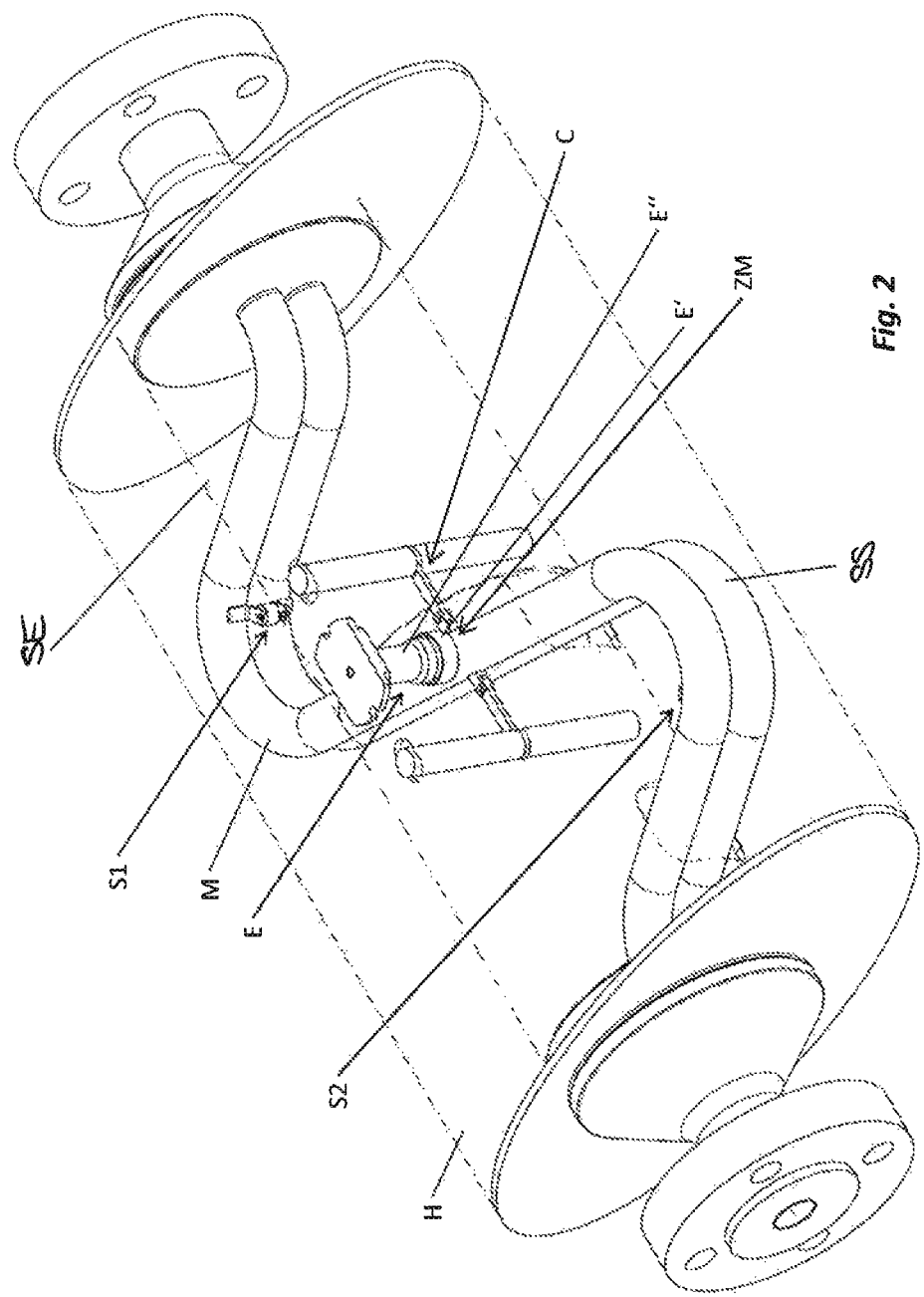
FIGS. 2 and 3 are in different perspective side views, an example of an embodiment of a measuring transducer of vibration-type suitable for a measuring system according to FIG. 1.
Figure 3:
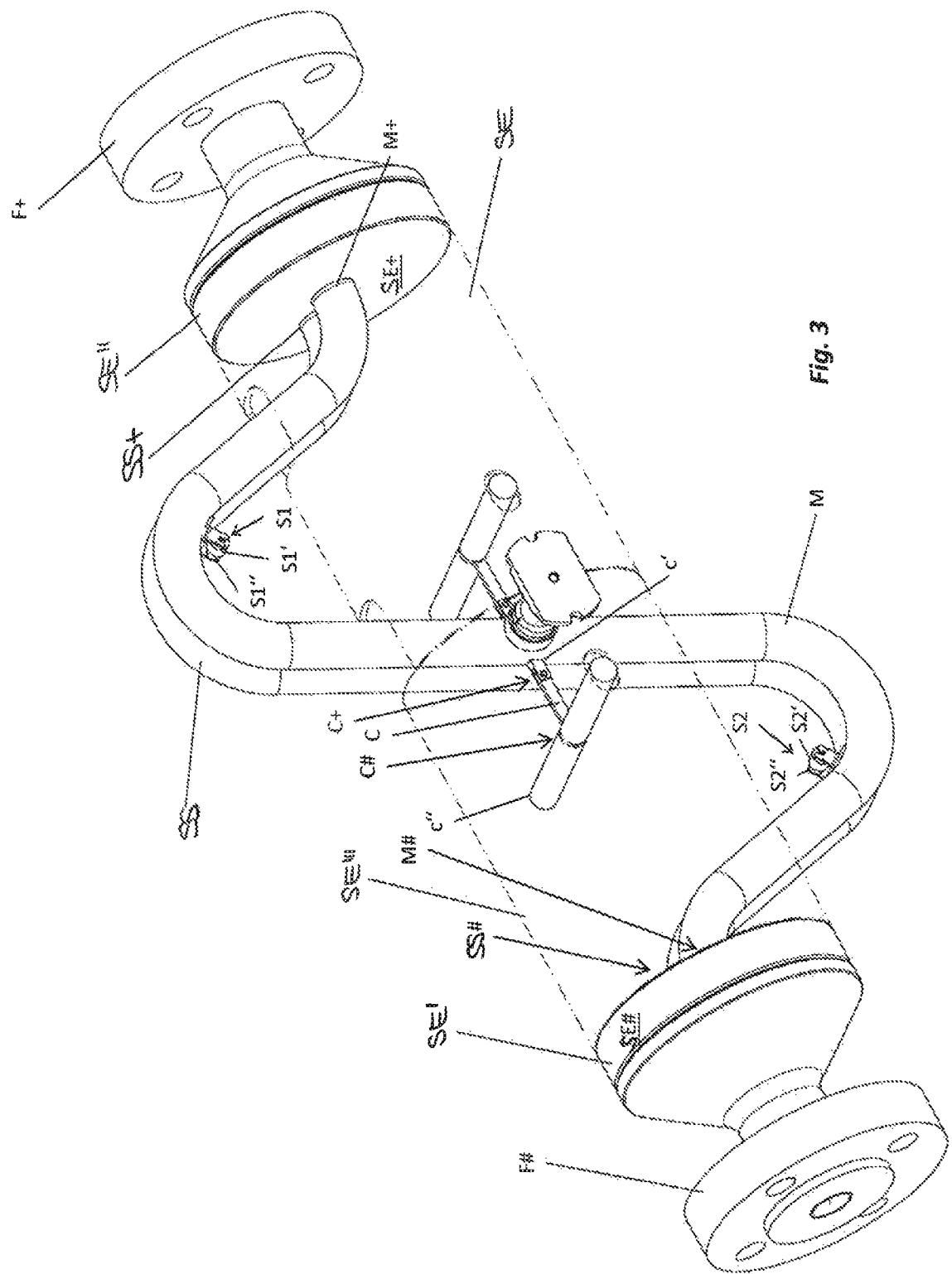

The measuring tube M is according to an additional embodiment of the invention, and as directly evident from the combination of FIGS. 2 and 3 and 4, embodied point symmetrically relative to a symmetry center ZM, and can, consequently, be, for example, straight, or at least in a middle section, also S-, respectively Z-shaped, in given cases, also in such a manner that, as evident also from FIG. 4, alternately arc shaped tube sections and straight tube sections are arranged serially following one another. This has, among other things, the advantage that, for the case, in which oscillations of the measuring tube with three oscillation antinodes serve as wanted oscillations, the measuring transducer can, such as already presented in the above mentioned U.S. Pat. No. 7,077,014, also be so embodied that the wanted oscillations of the measuring tube produce no, or at least no mentionable, transverse forces, even in the case of density changing in considerable measure as a function of time, so that no associated disturbances of the Coriolis oscillations need to be cared for.

For additionally improving the oscillatory behavior, not least of all also for additional lessening of the aforementioned transverse forces, the measuring transducer, according to another embodiment of the invention, is supplementally equipped with a spring element C, which is mechanically coupled both with the measuring tube as well as also with the first support element, in such a manner that the spring element is elastically deformed during operation as result of a movement of the measuring tube relative to the first support element. For such purpose, the spring element is mechanically connected with a first end C+ with the measuring tube M, for example, at a securement point c' lying on an imaginary circularly shaped peripheral line of the measuring tube M imaginarily contacting also the first exciter component E', and with a second end C# with the support element SE, for example, at a securement point c" laterally spaced from the second exciter component E". In such case, the first end C+ of the spring element C and the measuring tube M are connected with one another as rigidly as possible, namely in a manner excluding relative movements of the end C+ and the measuring tube, respectively the second end C# of the spring element C and the support element SE are connected with one another as rigidly as possible, namely in a manner excluding relative movements of said end and the support element SE. The spring element C can be formed, for example, by means of a helical spring or, however, also, such as directly evident from a combination of FIGS. 2-5, by means of a leaf spring, which is connected with the measuring tube by means of a first holder affixed by material bonding to the measuring tube to form the securement point c' and with the support element SE by means of a rod-shaped second holder affixed by material bonding to the support element SE to form the securement point c". As already shown in the above mentioned U.S. Pat. No. 7,077,014, the measuring transducer MT can also be additionally trimmed by means of the spring element C in such a manner that, as result, as also symbolized in FIG. 7 by the continuous line, the transverse forces developed by the wanted oscillations of the measuring tube can completely neutralize one another, so that the measuring transducer MT no longer produces mentionable transverse forces, which otherwise could be transmitted to the connected pipeline.

Particularly for the case, in which the support element SS is embodied as a blind tube, the support element SS and the measuring tube M are, such as also directly evident from a combination of FIGS. 2-6, advantageously embodied essentially with equal construction, at least as regards their outer contours, as much as possible, however, also as regards all dimensions, respectively also as regards the materials from which they are, respectively, produced. In accordance therewith, also the support element SS has, same as the measuring tube M, according to an additional embodiment of the invention, a symmetry center ZSS, relative to which also the support element SS is point symmetric. Measuring tube M and support element SS are, in advantageous manner, furthermore, both in such a manner point symmetrically embodied and so arranged that, such as also directly evident from the combination of FIGS. 4 and 5, the symmetry center ZM of the measuring tube M and the symmetry center ZSS of the support element SS coincide at least in an imaginary projection plane PE of the measuring transducer extending between the measuring tube M and the support element SS, especially parallel to the measuring tube M and/or to the support element SS, so that, consequently, an inner part of the measuring transducer formed by means of measuring tube M and support element SS is likewise point symmetric relative to a symmetry center lying in the imaginary projection plane PE. In an additional embodiment of the invention, the support element SS is additionally formed by means of a blind tube extending at least sectionally parallel to the measuring tube M, namely a tube not flowed through by the medium to be measured, in such a manner that, as also directly evident from FIG. 5, and FIG. 6, a minimum separation between the measuring tube and the support element is constant at least over a region extending between the first oscillation sensor and the oscillation exciter. In another embodiment of the invention, both the measuring tube as well as also the support element SS are at least sectionally S-, respectively Z-shaped and/or at least sectionally straight; this, especially, in such a manner that, as directly evident from a combination of FIGS. 2-6, measuring tube M and support element SS are of equal construction, at least as regards their outer contours, especially, however, also as regards the respectively used materials and/or as regards their total geometry. In accordance therewith, the support element SS can in simple manner also be formed e.g. by means of a cylindrical tube having a tube wall and a lumen surrounded by the tube wall, for instance, also in such a manner that the lumen of the measuring tube M and the lumen of the tube forming the support element SS are equally large, and/or that a wall thickness of the tube wall of the tube forming the support element SS and the wall thickness of the tube wall of the measuring tube M are equally large. Consequently, measuring tube M and support element SS can be produced by means of two essentially equal tubes.

The support element SE includes in the example of an embodiment shown here, furthermore, a first endpiece SE' forming the first support end SE+ and formed, for example, by means of a plate or a funnel, a second endpiece SE" forming the second support end SE# and formed, for example, by means of a plate or a funnel, as well as an intermediate piece SE'", especially a cylindrical and/or tubular intermediate piece SE'", extending between the two, ideally equally constructed, endpieces SE', SE". The intermediate piece SE'", consequently the support element SE manufactured therewith, can, such as shown here in the example of an embodiment, accordingly also be formed by means of a hollow body, here in at least sectionally cylindrical, respectively tubular, form, for example, in such a manner that the support element SE formed by means of a ideally cylindrical tube having a tube wall, especially a metal tube wall, for example, of steel, as well as a lumen surrounded by the tube wall, at least partially encases both the measuring tube M as well as also the support element SS, and, consequently, has a lumen, through which both the measuring tube M as well as also the support element SS at least partially extend. In the case of a comparatively widely eccentric measuring tube M, respectively support element SS, namely a curved measuring tube M, respectively support element SS, protruding laterally from the support element SE, then obviously corresponding lateral openings for the measuring tube M, respectively support element SS, are provided in a side wall of such a tube body serving as support element SE. Support element SE can—such as quite usual in the case of such components of measuring transducers of the type being discussed—be produced, for example, of a stainless steel.

Support element SE can serve, furthermore, when correspondingly at least sectionally cylindrical, as a housing of the measuring transducer jacketing the measuring tube and support element SS together, in given cases, completed by means of corresponding housing caps for the possibly laterally protruding sections of the measuring tube M and support element SS. The support element SE can, however, also be embodied, such as directly evident from a combination of FIGS. 1-6, as an independent component of the measuring transducer MT and be directly manufacturable e.g. also from a comparatively cost effective, free machining—or structural steel, so that it together with the other components of the measuring transducer, especially also the measuring tube M and the support element SS, can be accommodated in a measuring transducer housing HT likewise formed as a separate component of the measuring transducer MT and serving here principally as a protective shell for hermetically sealing the interior of the measuring transducer MT from the surrounding atmosphere and, in given cases, also providing pressure—and/or explosion resistance. The measuring transducer housing HT can be manufactured, for example, of a smooth or also corrugated, stainless steel sheet or also a synthetic material, e.g. a plastic. Furthermore, the measuring transducer housing HT can, as also indicated in FIG. 1, have a connection nozzle, on which the electronics housing HE is mounted so as to form a measuring device of compact construction. Within the connection nozzles can be arranged, furthermore, a hermetically sealed and/or pressure resistant feedthrough manufactured, for example, by means of glass—and/or plastic potting compound, for electrical connection wires extending between the measuring—and operating electronics and the measuring transducer. The measuring transducer housing HT can, such as directly evident from a combination of FIGS. 2, 4 and 6, for instance, for the purpose of providing an as small as possible installed volume, on the one hand, and an as optimal as possible exploitation of the installed volume, on the other hand, be additionally so arranged relative to the support element SE that a longitudinal axis corresponding to a symmetry axis of the measuring transducer housing HT is inclined relative to a longitudinal axis corresponding to a principle axis of inertia of the support element SE by an angle, which is greater than 0° and less than 10°.

Measuring transducers of the type being discussed, consequently also those of the invention, have a plurality of natural disturbance modes, each with a resonant frequency, namely such oscillation modes, whose exciting during operation actually is not desired, since they would otherwise disturb the wanted oscillations, respectively the at least one oscillation signal. Of special interest in the case of the measuring transducer of the invention are also those oscillation modes, in the following referred to as disturbance modes of first type, in which the support element SE can, in each case, execute disturbing oscillations, namely, in each case, oscillations around its static resting position, effecting movements relative to measuring tube, as well as those oscillation modes, in the following referred to as disturbance modes of second type, in which the second support element can execute, in each case, disturbing oscillations, namely, in each case, oscillations effecting movements relative to measuring tube about its static resting position. For preventing an actually undesired exciting also of the disturbance modes by means of the oscillation exciter E, the measuring transducer is, according to an additional embodiment of the invention, furthermore so embodied that the resonant frequencies of each of the disturbance modes of first type as well as also each of the disturbance modes of second type deviate as durably as possible from the resonant frequency of the wanted mode, especially also by, in each case, more than 2 Hz.

In such case, it is, furthermore, to be taken into consideration, that, on the other hand, the resonant frequency of the wanted mode, consequently the wanted frequency, is, not least of all as result of time changes of the density of the medium flowing in the lumen of the measuring tube during operation of the measuring transducer, variable naturally within a wanted frequency interval extending, depending on application, over some tens or even some hundreds of hertz. Said wanted frequency interval has, in such case, a lower interval boundary, defined by a least frequency value not subceeded by the wanted frequency, as well as also an upper interval boundary, defined by a greatest frequency value not exceeded by the wanted frequency. The size of the wanted frequency interval, respectively the placing of its interval boundaries, is, in such case, determined both by the mechanical construction of the measuring transducer as well as also by the medium to be measured, consequently by the application in which the measuring transducer serves.

Particularly for the case, in which the support element SS is essentially of equal construction to the measuring tube M, the measuring transducer has, among other things, also a first disturbance mode of second type, which is similar to the wanted mode, in that the second support element can execute disturbing oscillations, which have exactly as many oscillation antinodes and oscillation nodes as the wanted oscillations of the measuring tube. For the purpose of preventing an undesired exciting of disturbance modes of second type, according to an additional embodiment of the invention, the measuring transducer is so embodied that the first disturbance mode of second type has a resonant frequency, which is as durably as possible, respectively always, less, especially by more than 2 Hz, than the resonant frequency of the wanted mode, consequently is correspondingly less than the lower interval boundary of the wanted frequency interval. This can be achieved, on the one hand, by means of the already mentioned spring element C, which increases the resonant frequency of the wanted mode, consequently also the interval boundaries of the wanted frequency interval. Alternatively or supplementally, however, also the resonant frequency of the first disturbance mode of second type can be further decreased, consequently the separation from the lower interval boundary of the wanted frequency interval can be increased, when, such as also schematically shown in FIGS. 4 and 5, a trimming weight W, virtually acting as a point mass, is mounted on the support element SS, for example, on a side of the support element SS facing away from the measuring tube. The effect of the trimming weight W in decreasing the resonant frequency of the first disturbance mode of second type can, in such case, be optimized by providing that the mass provided by the trimming weight W acts as much as possible at a site of maximum oscillation amplitude of the oscillations of the support element SS, for example, thus, such as schematically indicated in FIG. 4, in a central section of the support element SS, respectively a section of the support element SS lying opposite the oscillation exciter E.

In the case of adjusting measuring tube M and support element SS as regards the interval boundaries of the wanted frequency interval, respectively the resonant frequency of the first disturbance mode of second type, it is, furthermore, to be taken into consideration that the measuring transducer also has a second disturbance mode of second type, in which the second support element can execute such disturbing oscillations, which have one oscillatory antinode more, consequently one oscillation node more, than the wanted oscillations of the measuring tube. In an additional embodiment of the invention, it is, furthermore, provided that measuring tube M and support element SS are so matched to one another that resonant frequencies of the second disturbance modes of second type are more, especially more than 2 Hz, than the upper interval boundary of the wanted frequency interval, consequently durably more than the wanted frequency. As a result of this, thus the support element SS can at no point in time execute resonant oscillations with a resonant frequency corresponding to the wanted frequency, respectively the support element SS can, at most, execute resonant oscillations, which have resonant frequencies always deviating from the wanted frequency.

As already mentioned, measuring transducers of vibration-type with only a single curved or straight measuring tube can have, at times, increased measuring errors, even though the measuring transducer is almost ideally balanced over a significant wanted frequency interval, namely can be operated without producing mentionable undesired transverse forces as result of density changing with time. Further investigations of measuring transducers of the type being discussed have surprisingly shown that such measuring errors can be attributed, among other things, also to the fact that the measuring tube M and the support element SS, consequently components of the measuring transducer carrying each of the two sensor components of one and the same oscillation sensor, react differently to a disturbance transferred from the connected pipeline to the support element SE, respectively the measuring transducer housing HT possibly formed therewith, for example, a disturbance in the form of a vibration of the pipeline with a frequency corresponding to the wanted frequency. Thus, measuring transducers of the type being discussed have, at times, a mechanical common-mode suppression insufficient for the desired accuracy of measurement. This is not least of all due to the fact that in the case of conventional measuring transducers the measuring tube M is typically coupled to the support element SE differently than to the support element SS.

Accordingly, it is furthermore provided in the case of the measuring transducer of the invention that both the tube end M+ as well as also the support end SS+ are mechanically connected with the support end SE+ and both the tube end M# as well as also the support end SS# are mechanically connected with the support end SE#. This is provided, especially, in such a manner that the tube end M+ is connected rigidly with the support end SE+, namely in a manner excluding relative movements between tube end M+ and corresponding support end SE+, and the tube end M# is connected rigidly with the support end SE#, namely in a manner excluding relative movements between tube end M# and corresponding support end SE#, and the support end SS+ is connected rigidly with the support end SE+, namely in a manner excluding relative movements between support end SS+ and corresponding support end SE+, and the support end SS# is connected rigidly with the support end SE#, namely in a manner excluding relative movements between support end SS # and corresponding support end SE#. Ideally, in such case, the support end SE+ is equally rigidly connected with the corresponding tube end M+ as well as with the corresponding support end SS+, respectively the support end SE# is equally rigidly connected with the corresponding tube end M# as well as with the corresponding support end SS#. As a result of such a coupling of measuring tube M and support element SS with the support element SE, namely the measuring tube M and the support element SS can, such as schematically shown in FIG. 9, react to a disturbance oscillation transmittable externally via support element SE, for example, via support end SE+ and/or via support end SE#, at the same time to measuring tube M and support element SS, and having a disturbance frequency, with a parallel oscillation not damaging for the measuring of the mass flow rate, namely, in each case, with an oscillation not changing a separation between the two sensor components S1, S1" and having, in each case, a frequency corresponding to the disturbance frequency; this not least of all also for the case, in which the disturbance frequency corresponds to the resonant frequency of the wanted mode, consequently the wanted frequency. Depending on type, respectively action direction, of the disturbance introduced, in each case, into the measuring transducer, the parallel oscillation can have one or more oscillation antinodes, for example, also, such as shown in FIG. 9 only by way of example, two oscillation antinodes. Associated therewith, both the measuring tube and the support element SS can, in each case, also assume an oscillation form corresponding to the Coriolis oscillations, without this influencing the oscillatory signal.

The invention claimed is:

1. A measuring transducer of the vibration-type for a Coriolis mass flow measuring device, which measuring transducer comprises:
   a measuring tube exhibiting an inlet-side, first tube end and an outlet-side, second tube end, and exhibiting a tube wall with a predetermined wall thickness and with a lumen surrounded by said tube wall and extending between said first and said second tube ends, which measuring tube is adapted to guide a flowing medium in its lumen, and during guiding the flowing medium to be caused to oscillate about a static resting position for producing Coriolis forces;
   a first support element, said first support element exhibiting a first support end connected mechanically with said first tube end of said measuring tube and said first support element exhibiting a second support end connected mechanically with said second tube end of said measuring tube;
   a second support element, said second support element is laterally spaced from said measuring tube and is mechanically connected with said first support end of said first support element with a first support end as well as also with the second support end of said first support element with a second support end;
   an oscillation exciter; and
   at least a first oscillation sensor, wherein:
   the measuring transducer exhibits a wanted mode, namely an oscillatory mode, in which said measuring tube can execute wanted oscillations, namely oscillations about its said static resting position suitable for producing Coriolis forces with a wanted frequency corresponding to a resonant frequency of said wanted mode;
   said oscillation exciter is adapted to excite said wanted oscillations of said measuring tube; and
   said first oscillation sensor includes a first sensor component affixed externally on said measuring tube, and a second sensor component mounted on said second support element, and said first oscillation sensor is adapted to register movements of oscillations of said measuring tube relative to said second support element, and to convert said registered movements into a first oscillatory signal representing oscillations of said measuring tube.

2. The measuring transducer as claimed in claim 1, wherein:
   said oscillation exciter includes:
   a first exciter component affixed externally on said measuring tube; and
   a second exciter component mounted on said first support element.

3. The measuring transducer as claimed in claim 2, wherein:
   the measuring transducer, except for said oscillation exciter, has no oscillation exciter with an exciter component mounted on said first support element; and/or
   the measuring transducer has no oscillation exciter with an exciter component mounted on said second support element.

4. The measuring transducer as claimed in claim 1, wherein:
   said first support element is adapted to be inserted into the course of a pipeline in such a manner that the lumen of said measuring tube communicates with a lumen of said pipeline to form a flow path.

5. The measuring transducer as claimed in claim 1, wherein:
   said first support end of said first support element includes a connecting flange, into which said first tube end of the measuring tube opens; and
   said second support end of said first support element includes a connecting flange, into which said second tube end of said measuring tube opens.

6. The measuring transducer as claimed in claim 1, wherein:
   said first support element is formed by means of a hollow body.

7. The measuring transducer as claimed in claim 1, wherein:
   said first support element exhibits a lumen, through which both said measuring tube as well as also said second support element extend.

8. The measuring transducer as claimed in claim 1, wherein:
   said first support element includes a first endpiece forming said first support end, a second endpiece forming said second support end, as well as an intermediate piece.

9. The measuring transducer as claimed in claim 1, wherein:
   said first support element has a maximum flexibility, which is less than a maximum flexibility of said measuring tube.

10. The measuring transducer as claimed in claim 1, wherein:
    said first support element has a maximum flexibility, which is less than a maximum flexibility of said second support element.

11. The measuring transducer as claimed in claim 1, wherein:
    said first support element is formed by means of a cylindrical tube including a tube wall and a lumen surrounded by said tube wall.

12. The measuring transducer as claimed in claim 11, wherein:
    a wall thickness of said tube wall of the tube forming said first support element is greater than the wall thickness of said tube wall of the measuring tube.

13. The measuring transducer as claimed in claim 1, wherein:
the measuring transducer, except for said measuring tube, has no tube, which is adapted to guide a medium flowing in a lumen and during that to be caused to oscillate about a static resting position.

14. The measuring transducer as claimed in claim 1, further comprising:
a second oscillation sensor;
including a first sensor component spaced from said first sensor component of said first oscillation sensor and affixed externally on said measuring tube,
and including a second sensor component spaced from said second sensor component of said first oscillation sensor and mounted on said second support element.

15. The measuring transducer as claimed in claim 14, wherein:
the measuring transducer has, except said first and said second oscillation sensors no oscillation sensor with a sensor component mounted on said second support element; and/or
said second oscillation sensor is adapted to register movements of said measuring tube relative to said second support element, especially movements of oscillations of said measuring tube with the wanted frequency, and to convert such into a second oscillatory signal representing oscillations of said measuring tube.

16. The measuring transducer as claimed in claim 1, wherein:
the resonant frequency of the wanted mode depends on a density, of the medium guided in said measuring tube.

17. The measuring transducer as claimed in claim 1, wherein:
the measuring transducer exhibits a plurality disturbance modes of the first type having, in each case, a resonant frequency, namely oscillation modes, in which said first support element can, in each case, execute disturbing oscillations, namely, in each case, oscillations effecting movements about its static resting position relative to said measuring tube, and the measuring transducer exhibits a plurality of disturbance modes of the second type having, in each case, a resonant frequency, namely oscillation modes, in which said second support element can, in each case, execute disturbing oscillations, namely, in each case, oscillations effecting movements about its static resting position relative to said measuring tube; and
said resonant frequencies both of each of the disturbance modes of the first type as well as also each of the disturbance modes of the second type deviates, from the resonant frequency of the wanted mode.

18. The measuring transducer as claimed in claim 17, wherein:
the measuring transducer exhibits a first disturbance mode of second type, which is similar to the wanted mode and in which said second support element can execute such disturbing oscillations, which have exactly as many oscillation antinodes and oscillation nodes as the wanted oscillations of said measuring tube.

19. The measuring transducer as claimed in claim 18, wherein:
the first disturbance mode of said second type has a resonant frequency, which is less than the resonant frequency of the wanted mode.

20. The measuring transducer as claimed in claim 1, wherein:
the wanted frequency is variable within a wanted frequency interval.

21. The measuring transducer as claimed in claim 18, wherein:
the wanted frequency interval exhibits a lower interval boundary, defined by a smallest frequency value not subceeded by the wanted frequency; and
said first disturbance mode of the second type exhibits a resonant frequency, which is less than the lower interval boundary of the wanted frequency interval.

22. The measuring transducer as claimed in claim 21, wherein:
the measuring transducer exhibits a second disturbance mode of the second type, in which said second support element can execute disturbing oscillations, which have one oscillatory antinode more, consequently one oscillation node more, than the wanted oscillations of said measuring tube;
the wanted frequency interval exhibits an upper interval boundary, defined by a greatest frequency value not exceeded by the wanted frequency; and
wherein the second disturbance mode of second type has a resonant frequency, which is greater, than the upper interval boundary of the wanted frequency interval.

23. The measuring transducer as claimed in claim 1, wherein:
the wanted oscillations of said measuring tube have four oscillation nodes, respectively three oscillation antinodes.

24. The measuring transducer as claimed in claim 22, wherein:
the measuring transducer exhibits a third disturbance mode of the second type, in which said second support element can execute disturbing oscillations, which have one oscillatory antinode less, consequently one oscillation node less, than the wanted oscillations of said measuring tube; and
said third disturbance mode of the second type has a resonant frequency, which is less, especially by more than 2 Hz, than the lower interval boundary of the wanted frequency interval.

25. The measuring transducer as claimed in claim 1, further comprising:
a spring element mechanically coupled both with said measuring tube as well as also with said first support element, said spring element is adapted to be elastically deformed as a result of movement of said measuring tube relative to said first support element.

26. The measuring transducer as claimed in claim 25, wherein:
said spring element has a first end connected with said measuring tube.

27. The measuring transducer as claimed in claim 1, wherein:
said spring element has a second end connected with said first support element.

28. The measuring transducer as claimed in claim 1, further comprising:
a trimming weight applied on said second support element.

29. The measuring transducer as claimed in claim 1, wherein:
the measuring tube and said second support element are adapted to react to a disturbance oscillation transmittable externally via said first support element at the same time to said measuring tube and said second support element and having a disturbance frequency with a parallel oscillation, namely, in each case, with an oscillation not changing a separation between said first and said second sensor components and having, in each case, a frequency corresponding to the disturbance frequency.

30. The measuring transducer as claimed in claim 1, wherein:
said first support end of said first support element and said first support end of said second support element are rigidly connected with one another, namely in a manner impeding relative movements of said first support end of said first support element and said first support end of said second support element; and
said second support end of said first support element and said second support end of said second support element are rigidly connected with one another, namely in a manner impeding relative movements of said second support end of said first support element and said second support end of said second support element.

31. The measuring transducer as claimed in claim 1, wherein:
the first support end of the first support element is equally rigidly connected with the first tube end of the measuring tube as well as with the first support end of the second support element, and
the second support end of the first support element is equally rigidly connected with the second tube end of the measuring tube as well as with the second support end of the second support element.

32. The measuring transducer as claimed in claim 1, wherein:
said first support end of said first support element is mechanically connected with said first tube end of said measuring tube and with said first support end of said second support element in a manner impeding movements of said first tube end of said measuring tube relative to said first support end of said second support element; and
said second support end of said first support element is mechanically connected with said second tube end of said measuring tube and with said second support end of said second support element in a manner impeding movements of said second tube end of said measuring tube relative to said second support end of said second support element.

33. The measuring transducer as claimed in claim 1, wherein:
said measuring tube and said second support element extend parallel to one another; and/or
said measuring tube is at least sectionally S-, respectively Z-shaped and/or at least sectionally straight; and/or
said second support element is at least sectionally S-, respectively Z-shaped and/or at least sectionally straight; and/or
said second support element is formed by means of a cylindrical tube including a tube wall and a lumen surrounded by said tube wall.

34. The measuring transducer as claimed in claim 1, wherein:
said measuring tube exhibits a symmetry center, relative to which said measuring tube is point symmetric.

35. The measuring transducer as claimed in claim 34, wherein:
said second support element exhibits a symmetry center, relative to which said second support element is point symmetric.

36. The measuring transducer as claimed in claim 35, wherein:
the symmetry center of said measuring tube and the symmetry center of said second support element coincide at least in an imaginary projection plane of the measuring transducer extending between said measuring tube and said second support element, especially such a plane, which is parallel to said measuring tube and/or to said second support element.

37. The measuring system, especially for measuring a mass flow rate and/or a mass flow of a medium flowing in a pipeline, comprising:
a measuring transducer as claimed in claim 1, as well as;
a measuring—and operating electronics electrically connected to said measuring transducer.

38. The measuring transducer as claimed in claim 1, wherein:
the first support element is at least sectionally cylindrical.

39. The measuring transducer as claimed in claim 1, wherein:
the first support element is embodied as a housing jacketing said measuring tube.

40. The measuring transducer as claimed in claim 1, wherein:
the second support element is formed by means of a blind tube constructed equally to said measuring tube.

41. The measuring transducer as claimed in claim 1, wherein:
the second support element extends at least sectionally parallel to said measuring tube.

42. The measuring transducer as claimed in claim 1, wherein:
said first support end of said second support element is rigidly connected with said first support end of said first support element; and
said second support end of said second support element is rigidly connected with said second support end of said first support element.

43. The measuring transducer as claimed in claim 1, wherein:
said wanted oscillations of said measuring tube exhibit exactly four oscillation nodes, respectively exactly three oscillation antinodes.

44. The measuring transducer as claimed in claim 1, wherein:
said first support element is formed by means of a hollow body at least partially enveloping both said measuring tube as well as also said second support element.

45. The measuring transducer as claimed in claim 6, wherein:
the hollow body forming said first support element is at least sectionally cylindrical.

46. The measuring transducer as claimed in claim 6, wherein:
the hollow body forming said first support element is tubular.

47. The measuring transducer as claimed in claim 6, wherein:
the hollow body forming said first support element at least partially envelops both said measuring tube as well as also said second support element.

48. The measuring transducer as claimed in claim 8, wherein:

said intermediate piece is cylindrical.

49. The measuring transducer as claimed in claim 8, wherein:

said intermediate piece is tubular.

50. The measuring transducer as claimed in claim 8, wherein:

said intermediate piece forms a hollow body at least partially enveloping both said measuring tube as well as also said second support element.

51. The measuring transducer as claimed in claim 11, wherein:

said measuring tube and said second support element are, in each case, arranged, at least partially, within a lumen of said tube forming the first support element.

52. The measuring transducer as claimed in claim 11, wherein:

a wall thickness of the tube wall forming said first support element tube is greater than the wall thickness of said tube wall of the measuring tube.

53. The measuring transducer as claimed in claim 12, wherein:

the wall thickness of said tube wall of said tube forming said first support element is greater than twice as large as the wall thickness of said tube wall of said measuring tube.

54. The measuring transducer as claimed in claim 12, wherein:

the wall thickness of said tube wall of said measuring tube is greater than 0.5 mm and less than 3 mm and the wall thickness of said tube wall of said tube forming said first support element is greater than 3 mm.

55. The measuring transducer as claimed in claim 21, wherein:

the resonant frequency of said second disturbance mode of the second type is less than the lower interval boundary of said wanted frequency interval by more than 2 Hz.

56. The measuring transducer as claimed in claim 22, wherein:

the resonant frequency of said second disturbance mode of the second type is greater than the upper interval boundary of said wanted frequency interval by more than 2 HZ.

\* \* \* \* \*